Aug. 2, 1927.
A. Y. DODGE
BRAKE CONTROL ACTUATING MECHANISM
Filed March 22, 1924
1,637,520
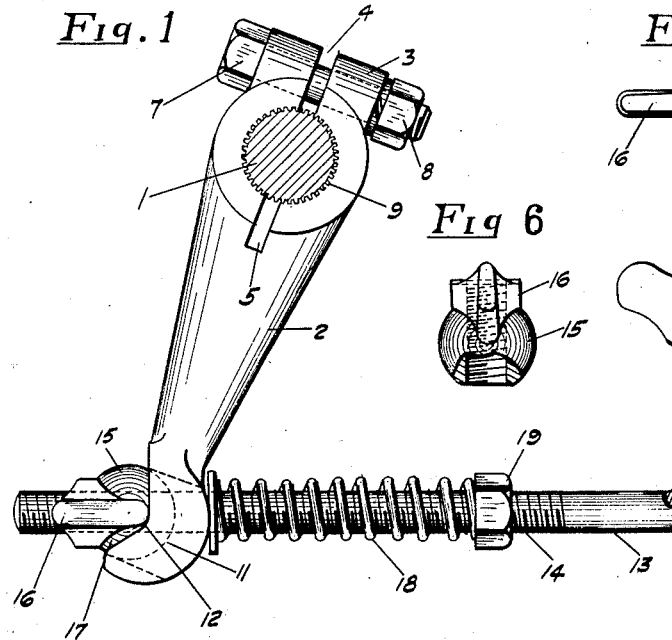
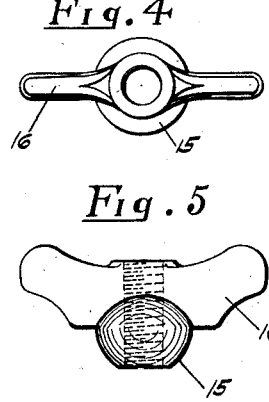
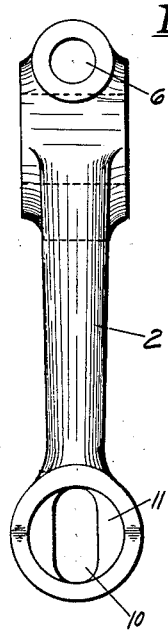
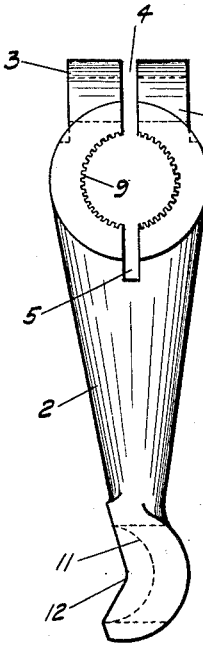
INVENTOR
ADIEL Y. DODGE
BY
A. D. T. Libby
ATTORNEY Patented Aug. 2, 1927.

1,637,520

UNITED STATES PATENT OFFICE.

ADIEL Y. DODGE, OF SOUTH BEND, INDIANA, ASSIGNOR, BY MESNE ASSIGNMENTS, TO BENDIX BRAKE COMPANY, OF CHICAGO, ILLINOIS, A CORPORATION OF ILLINOIS.

BRAKE-CONTROL-ACTUATING MECHANISM.

Application filed March 22, 1924. Serial No. 701,172.

This invention relates to a mechanism used in connection with automotive vehicle brakes and while it is primarily useful in the Perrot type brake controls, it is not necessarily limited thereto, as it can be used to advantage in other systems of mechanical connections.

In the Perrot type of brake controls, the brake control lever goes through a variety of small movements due to spring deflections of the vehicle, other than the natural rocking movement with its control shaft.

It is, therefore, the principal object of my invention to provide means for taking care of this variety of movements through the medium of a self aligning joint between the actuating rod operated by hand or foot, and the control shaft lever.

It is a further object of my invention to provide in a self aligning joint for the purpose set forth, means for adjusting the rod and lever to any desired position, at the same time to provide a joint which will not rattle.

Another important object is to provide means that will protect against overtightening of the brakes.

These and other objects will be apparent to one skilled in the art after a study of the specification taken in connection with the annexed drawing, wherein:

Figure 1 is a side view of a completely assembled joint entering into my brake control actuating mechanism.

Figure 2 is a side view of the control shaft lever, while

Figure 3 is a front view of Fig. 2.

Figure 4 is a plan view of a ball and wing nut used in the self aligning joint.

Figure 5 is a side elevation of Fig. 4, while

Figure 6 is an end view of Fig. 5.

Referring now to the details wherein like numbers refer to corresponding parts in the various views, 1 illustrates a brake control shaft which leads to the brake cam or camshaft, or the equivalent thereof. 2 is a brake lever having a hub 3 slotted at 4, the slot being extended to 5. A bolt hole 6 receives a bolt 7 on which a nut 8 is used to draw the hub together in order to cause the splines 9 to grip the control shaft 1. The other end of the lever 2 has a slot 10 therein, and around the slot is a countersunk portion forming a socket 11. In the rim of the socket, on opposite sides of the slot, are formed notches 12. An actuating rod 13 is threaded at 14, the threaded end passing through the slot 10. Carried on the threaded end of the rod, beyond the lever 2, is an arcuately formed member 15 having wings 16, preferably integral therewith. The arcuately formed member 15 is threaded to engage the end of the rod and fits in the socket 11, thereby forming a ball and socket joint. As shown in Fig. 1, the wings 16 are normally out of engagement with the sides of the notches 12 as is shown by the clearance 17. This clearance on both sides of the end of the lever 2 allows the ball to rock a few degrees in a horizontal plane, before the wings engage the sides of the notches. The ball and socket are held in operative position by spiral spring 18 carried on the rod 13, being adjustable thereon by means of the nut 19. The spring thus serves to hold the ball of the arcuately formed member firmly in the socket, also to retain the wing portion of the arcuately formed member in position so as to prevent this member from turning more than a few degrees, and further the spring assists in causing the lever 2 to return to its normal position after the brakes are released.

On loosening the nut 8 and placing a wedge in the slot 4, the lever 2 is released from engagement with the shaft 1 when it is desired to change the position of lever 2 thereon. To take up slack, the ball and wing nut may be turned, the wings 16 riding over the edges of the notches 12 and back into the notches each half revolution.

Overtightening of the brakes; that is to say, adjusting the brakes too close to the brake drums, is guarded against in the following manner: On turning the ball and wing member, wings 16 engage the sides of the notches 12, moving the lever 2 to the right, thereby actuating the brake control shaft 1. When it is discovered that the wings 16 cannot be forced over the inclined side of the notches, it is reasonably sure that the cam actuating the brake shoes has been moved to a point where the shoes are firmly against the drum. Then on releasing the wing nut it is automatically carried back by the sloping sides of the notch to its normal position as indicated in Fig. 1, thereby assuring the operator that the brake shoes are not dragging on the brake drums and adding to the factor of safety and making it more difficult to adjust the brakes too tightly.

The substantially oblong slot 10 provides a clearance in connection with the actuating rod 13 so that the lever 2 may be swung through considerable of an angle during the actuation of the brakes.

It will be understood that the details of my invention may be varied to a considerable extent, without departing from the spirit of my invention and the scope of the appended claims.

Having thus described my invention, what I claim is:

1. Connections comprising, in combination, a member having a substantially spherical socket with an opening arranged centrally of its bottom, there being opposite notches in the edge of the socket, a threaded link passing through the opening, a device threaded on one end of the link and including a part with a substantially semi-spherical base seated in the socket, said device having opposite projections seated in the notches, a stop device on the link on the side of said member opposite said part and spaced from the member, and a coil spring sleeved on the link and confined between the stop device and said member and holding said notches in engagement with the projections.

2. Connections comprising, in combination, a lever, a link, an adjustable device connecting the link and lever, and a spring yieldingly holding said device, the lever and said device having surfaces in operative engagement to turn said device automatically to a predetermined angular position when pressure is applied to the lever.

3. Connections comprising, in combination, a member having a substantially semi-spherical socket with an opening in its bottom and with a notch having sloping sides in its edge, a threaded link passing through the opening, a stop on the link on the opposite side of said member from the socket, a spring confined between the stop and said member, and a device threaded on the link including a semi-spherical part in the socket and a lateral projection in the notch.

In testimony whereof, I affix my signature.

ADIEL Y. DODGE.